United States Patent [19]
Heritage et al.

[11] Patent Number: 4,928,316
[45] Date of Patent: May 22, 1990

[54] OPTICAL SYSTEMS AND METHODS BASED UPON TEMPORAL STRETCHING, MODULATION AND RECOMPRESSION OF ULTRASHORT PULSES

[75] Inventors: Jonathan P. Heritage, Red Bank Borough; Andrew M. Weiner, Eatontown Borough, both of N.J.

[73] Assignee: Bell Communications Research, Inc., Livingston, N.J.

[21] Appl. No.: 152,237

[22] Filed: Feb. 4, 1988

[51] Int. Cl.$^5$ ............................................. H04B 9/00
[52] U.S. Cl. .................................... 455/600; 455/608; 455/617
[58] Field of Search ................... 370/1, 2, 3; 455/606, 455/607, 608, 609, 611, 612, 615, 616, 617–619

[56] References Cited

U.S. PATENT DOCUMENTS 3,530,298  9/1970  Hubbard ............................. 455/619
4,655,547  4/1987  Heritage et al. ................ 350/162.12

OTHER PUBLICATIONS

J. A. Valdmanis, 1986 Proceedings of the Fifth OSA Topical Meeting on Ultrafast Phenomena, edited by G. R. Fleming and A. E. Siegman and entitled "Real Time Picosecond Optical Oscilloscope".

S. K. Korotky et al., "Optical Modulation Above 20 GHz Using Waveguide Electro-Optic Switch," paper FB-4, Picosecond Electronics and Optoelectronics Conference Digest, Jan. 14–16, Incline Village, Nevada, 1987.

J. Agostinelli et al., "Optical Pulse Shaping with a Grating Pair," *Applied Optics,* vol. 18 (14), Jul. 15, 1979, pp. 2500–2504.

M. Haner et al., "Generation of Programmable, Picosecond-Resolution Shaped Laser Pulses by Fiber-Grating Pulse Compression," *Optics Letters,* 12 (6), Jun. 1987.

M. Pessot et al., "1000 Times Expansion/Compression of Optical Pulses for Chirped Pulse Amplification," *Optics Communications,* 62 (6), Jun. 1987.

O. E. Martinez, "3000 Times Grating Compressor with Positive Group Velocity Dispersion: Application to Fiber Compensation in 1.3–1.6 m Region," *IEEE J. Quantum Electronics,* QE-23, 59–64, Jan. 1987.

E. B. Treacy, "Optical Pulse Compression with Diffraction Gratings," *IEEE J. of Quantum Electronics,* QE-5, 454–458 (1969).

D. Strickland et al., "Compression of Amplified Chirped Optical Pulses," *Optics Communications,* 56 (3), 219–221 (1985).

N. Nakatuska et al., "Nonlinear Picosecond Pulse Propagation Through Optical Fibers with Positive Group Velocity Dispersion," *Physics Review Letters,* 47, 910–913 (1981).

Weik, Communications Standard Dictionary, Definition of Chirp, Pulse Frequency Modulation and Source Chip.

Weiner et al., "Frequency Domain Coding of Femtosecond Pulses for Spread Spectrum Communications", Conference on Laser and Electro Optics, May 87, pp. 294–296.

Brodkner, "Phased Array Radar," *Scientific American* 252, pp. 94–102, 1985.

Schmid, LLE Report, "Short Pulse Amplification Using Pulse Compression Techniques", vol. 25, pp. 42–46, Oct.–Dec. 1985.

Tomlinson, "Compression of Optical Pulses Chirped by Self Phase Modulation in Fibers", Journal of Optical Society, vol. 1, #2, pp. 139–149, Apr. 84.

*Primary Examiner*—Robert L. Griffin
*Assistant Examiner*—L. Van Beek
*Attorney, Agent, or Firm*—James W. Falk

[57] ABSTRACT

A communications systems is characterized by a pulse-shaping technique for producing shaped, stabilized, ultra-short (picosecond to femtosecond) pulses containing encoded information. Pulse shaping is accomplished by temporally stretching and chirping an ultra-short pulse from a pulse generator, modulating the pulse in real time and temporally compressing the pulse in a manner so as to cancel the original chirp.

23 Claims, 2 Drawing Sheets

OPTICAL SYSTEMS AND METHODS BASED UPON TEMPORAL STRETCHING, MODULATION AND RECOMPRESSION OF ULTRASHORT PULSES

BACKGROUND OF THE INVENTION

1. Field of the Invention

The invention relates to optical systems and methods, and in particular to systems and methods involving ultra-short, stable, shaped optical pulses.

2. Description of the Prior Art

Various types of optical systems employing optical pulse signals are known in the prior art. High-speed optical computing and communication systems require precisely defined pulses. Future systems will require that these pulses be ultra-short pulses, i.e., pulses on the picosecond to femtosecond time scale with specific temporal and/or spatial intensity profiles for triggering, coding, and analysis.

Several approaches to pulse shaping have been proposed in the prior art that generally use either active or passive shaping techniques; however, these systems have not been applicable to ultra-short pulses, e.g., in the femtosecond pulse width range. Active pulse shaping techniques include electro-optic deflectors and Pockels cells. Passive pulse shaping techniques include mirror stackers, etalon stackers, intensity dependent filters, flat lens shapers, nonlinear interferometers, birefringent filters and double-grating pulse shaping systems.

In particular, an article entitled "Optical Pulse Shaping With a Grating Pair" by J. Agostinelli, G. Harvey, T. Stone and C. Gabel in Applied Optics, Vol. 18, No. 14, 15 July 1979, pp. 2500–2504 discloses the concept of a passive pulse shaping system that uses a pair of diffraction gratings along with various filters of amplitude and/or phase type to alter the temporal and/or instantaneous spectral profile of an input pulse. Amplitude filters will attenuate certain spectral components and therefore certain portions of the temporal profile of the input pulse will also be attenuated. Phase filters will shift various groups of spectral components in time.

As shown in the article, an unshaped input pulse enters the system by impinging upon a first diffraction grating. The diffracted beam emerges as a diverging fan of rays due to the frequency bandwidth of the input pulse and the dispersive nature of the grating. The diverging beam then impinges upon a second diffraction grating of identical groove spacing as the first grating. The angles of the two gratings are precisely matched, so that after the second diffraction, the spectrally separated rays emerge parallel to the input ray direction. A mirror is set perpendicular to the beam emerging from the second grating in order to reflect the beam back through the pair of diffraction gratings, with each ray retracing its steps, so that a collimated beam emerges at the output of the system in the opposite direction of the incident beam.

Each spectral component of the input pulse traverses a different distance in passages through this system. However, due to the negatively dispersive nature of the grating pair, high frequency components of the input pulse emerge prior to the lower frequency components.

In the plane of the mirror, called the filter plane, there is both spatial and temporal transposition of the spectral components of the input pulse. Amplitude filters are inserted in the "filter plane" to attenuate certain spectral components and therefore attenuate certain portions of the temporal profile of the output pulse. Phase filters are inserted to shift various groups of spectral components in time.

Further, the article discloses the use of various opaque strips placed at various places in the "filter plane" to alter the shape of the output pulse and the use of a plate having a continuously varying transmission function to produce a linearly ramped output pulse.

Unfortunately, the output pulse from the system shown in the article is linearly frequency modulated, and as predicted by linear systems theory the Fresnel transform of a band-limited Gaussian is a wider Gaussian with linear frequency modulation. Furthermore, the output pulse is not transform-limited, i.e., the output pulse has more spectral width than is necessary to support the features of the shape of the intensity profile, and it is necessarily longer than the input pulse. Since a transform-limited pulse will propagate a greater distance in an optical fiber than a non-transform-limited pulse before being distorted by dispersion of the group velocity, such a configuration is a substantial drawback in using output pulses from the system disclosed in the article in optical digital communications systems. Also, because of the fact that the shaped output pulse is longer than the input pulse, the full bandwidth of the input pulse cannot be effectively utilized.

M. Haner et al. in an article in Optics Letters 12 (6) June 1987 entitled, "Generation of Programmable, Picosecond-Resolution Shaped Laser Pulses by Fiber Grating Pulse Compression", describe programmable fiber-optic and grating pulse compression techniques. The above article is incorporated herein by reference. The Haner et al. technique uses three steps: (1) the generation of arbitrarily shaped microwave pulses; (2) modulation of a continuous wave laser with a waveguide electro-optic modulator driven by the shaped microwave pulses; and (3) fiber-and-grating pulse compression to shorten the shaped optical pulses to the picosecond regime. By this technique, one must first determine what the nature of the input pulse to the compressor must be to obtain the desired shaped output pulse. Since propagation in the fiber is non-linear, this is a formidable task. In fact, there is no guaranty that an input pulse exists which would result in the desired shaped output pulse, and sufficient control of the desired pulse shaping is difficult. Also, the minimum pulse widths obtainable by this technique are limited. In order to achieve good compression, input pulses should not be much longer than 100 picoseconds. Haner et al. employ 135 picosecond pulses. Since their modulator has a 35 picosecond response, the shaped pulse can only contain a maximum of four features. Furthermore, as pointed out in the article, a maximum compression of only 10–20 is attainable without producing unwanted substructure. This corresponds to a minimum pulse width of 6–12 picoseconds.

Another optical system for pulse shaping is described in our U.S. Pat No. 4,655,547. In that optical system, an input optical pulse is chirped, and the chirped pulse is then passed through an optical component that spatially disperses the frequency components of the chirped pulse and partially compensates the chirp.

The spatially dispersed frequency components are then passed through spatial amplitude and/or phase masks the control and/or adjust the amplitude and/or phase of the frequency components. Finally, the masked components are passed through the first or a second optical component that returns the masked, spatially dispersed frequency components substantially to the spatial distribution of the input pulse while substantially completing the compensation of the chirp to form a transform limited output pulse which can be shorter than the input pulse.

Pulse shapings by the above technique employed prefabricated masks and therefore were not programmable in real time or at high speeds as would be desirable for communications systems. In order to achieve such programmability in that system, a multi-element modulator would have to be associated with the masks and at this time, multi-element modulator technology is immature and quite expensive. At the present time, a multi-element acoustic modulator is available which is limited to only 32 elements at a cost of about $25,000; however, even with the limitation of elements and costs there also exists a problem of crosstalk between elements.

Although such an optical system permits the creation of very short pulses useful in high-speed optical digital communications, there are frequently fluctuations in the width, shape, and energy of pulses formed by such optical systems. Such noise places a limit on the amount of information that may be communicated in such an optical system.

Prior to our copending U.S. patent application Ser. No. 936,488, entitled, "Apparatus for Stabilization of High Speed Optical Pulses", filed on Nov. 26, 1986 and assigned to the assignee hereof, now Pat. No. 4,746,193, May 24, 1988 there has not been a suitable technique for stabilizing very short optical pulses to the extent necessary for some optical communication system applications.

Briefly, and in general terms, that invention provides means for producing highly stabilized pulses from a fiber and grating pulse compressor. An input pulse is propagated in a length of single-mode optical fiber, where the pulse is chirped by the mechanisms of self-phase modulation and group velocity dispersion. In addition, the input power must be sufficiently high to generate significant stimulated Raman scattering (SRS) in the fiber. More particularly, the conversion efficiency to stimulate Raman scattering is preferred to be greater then 10%. SRS clamps the power of the chirped pulse and results in a spectral broadening which is non-symmetric. The chirped pulsed is compressed in the standard way in a grating pulse compressor. In the compressor, a first grating spatially disperses frequency components of the chirped pulse to produce a spatially dispersed beam. A spectral window (an aperture) is placed into the spatially dispersed beam to act as a band-pass filter. In particular, the window may be asymmetrically disposed to pick an off-center portion of the asymmetric spectrum. Position of the window is varied on a case-by-case basis according to the particulars of the exact asymmetric spectrum. The window passes only those frequency components which are linearly chirped (and hence are suitable for efficient pulse compression) and which are stabilized by SRS. In this way, stabilized, cleanly compressed pulses are produced.

In the copending U.S. patent application of Brackett et al., Ser. No. 065,023, filed June 22, 1987, and assigned to this same assignee, now Pat. No. 4,866,699, Sept. 12, 1989, an optical telecommunications systems is disclosed employing code division multiple access. The systems disclosed therein are incorporated herein by reference and are suitable for use with the ultra-short shaped pulses of the present invention.

SUMMARY OF THE INVENTION

The present invention comprises a communication system including means which allow programmable generation of arbitrarily shaped picosecond through femtosecond optical pulses and the method of achieving programmable generation of arbitrarily shaped ultra-short pulses. Pulse shaping is achieved in accordance with the invention by (1) temporally dispersing (stretching) ultra-short optical pulses, (2) manipulating the stretched pulses, e.g., by means of a high-speed single element serial modulator driven by a high-speed programmable drive signal, and thereafter (3) temporally combining (compressing) the manipulated stretched pulses to form the desired shaped pulse in accordance with the Fourier transform of the temporal modulation placed on the stretched pulse. The input optical frequencies of the communication system are derived from a coherent light source e.g., a laser, and the output shaped pulses are transmitted to receiver means for demodulating and/or reading the information conveyed by the shaped pulses.

The novel features of the invention and its advantages will be best understood from the following detailed description.

DETAILED DESCRIPTION OF THE INVENTION

Figure 1:
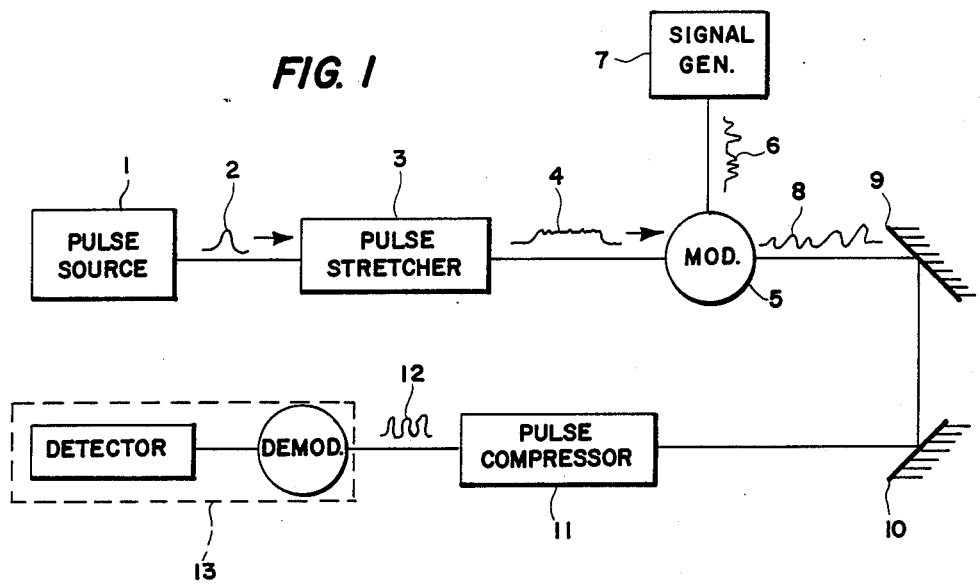
FIG. 1 is a block diagrammatic representation of an optical system in accordance with the present invention.

In accordance with the present invention pulse shaping of picosecond to femtosecond pulses is achieved by temporally dispersing (stretching) optical frequency pulses, modulating the stretched frequencies by means of phase and/or amplitude modulation and then temporally combining (compressing) the modulated frequencies to form the desired shaped pulses which contain information or data to be conveyed.

In our prior invention described in U.S. Pat. No. 4,655,543, we describe the use of diffraction gratings to spatially disperse the frequency components which make up a short, chirped optical pulse and the modulation of the spatially dispersed frequencies by means of amplitude and phase masks. The modulated frequencies are then spatially recollimated and reassembled to form a shaped pulse corresponding to the Fourier transform of the mask. In this technique, care is taken to cancel or avoid temporal dispersion of the pulse frequencies. While high resolution has been demonstrated, present technology does not allow affordable high-speed, real time programmability for applications such as optical communications utilizing this spatial dispersion technique. In contrast, the present invention which is based upon temporal dispersion of the pulse frequencies overcomes this and other problems.

Some advantages of the present invention are: (1) pulse shapes can be programmed in real time and only a single, serial modulator need be used for such programming; (2) higher resolution shaping, e.g., resolution by at least a factor of six better than that of the Haner and Warren technique, is possible; (3) ultra-short (e.g., in the order of 100 femtoseconds) pulses for greater information density is possible; (4) any output pulse shape may be obtained within limits set by the bandwidth and resolution requirements of the system; and (5) the complication of nonlinear propagation in optical fiber can be avoided.

Temporal dispersion techniques for pulse stretching and pulse compression have recently been reported in the literature. For example, an article by M. Pessot et al., Optics Communications 62 (6), June 1987 entitled, "1000 Times Expansion/Compression of Optical Pulses for Chirped Pulse Amplification" describes the use of diffraction gratings in both positive and negative group velocity dispersion configurations to expand and compress an optical pulse. The advantages of pulse amplification after stretching of the pulse can also be found in this reference. In Ultrafast Phenomena, V, edited by G. R. Fleming and A. E. Siegman, from the 1986 Proceedings of the Fifth OSA Topical Meeting on Ultrafast Phenomena, J. A. Valdmanis describes at pages 82-85, in his article entitled, "Real Time Picosecond Optical Oscilloscope", stretching of a chirped optical pulse by means of a dispersion shifted, single mode optical fiber. The above articles are incorporated herein by reference.

Various configurations such as those mentioned above can be employed for obtaining optical pulse shaping and modulation useful in accordance with the present invention. Some of these configurations are described with reference to the Figures.

Referring to FIG. 1, there is shown a simplified pictorial representation of an optical system useful in the practice of the present invention.

In accordance with the Figure, a source 1 of ultra-short pulses, such as a mode-locker laser or a fiber and grating pulse compressor produces an ultra-short (picosecond or femtosecond) pulse 2 which is to be shaped. It should be understood that any source of ultra-short pulses is suitable. The pulse 2 is directed to a temporal pulse stretcher 3 which produces a longer chirped pulse 4 having frequency components which arrive at a high-speed modulator 5 at different times. The high-speed modulator 5 is used to modulate the stretched chirped pulse 4 allowing for amplitude and/or phase manipulation of the individual optical frequency components arriving at different times. The modulator 5 is driven by a shaped microwave pulse 6 which is generated by a programmable microwave signal generator 7. Such a modulator is described in the Haner and Warren reference referred to above. The microwave pulse 6 is selected so as to produce the desired amplitude and/or phase modulation on the chirped, stretched optical pulse 4, resulting in the chirped shaped pulse 8. The shaped pulse 8 is directed, such as by means of mirrors 9 and 10 to an optical temporal pulse compressor 11 which cancels the chirp impressed on the pulse by the pulse stretcher 3. This results in a shaped output pulse 12 having features as short as the original pulse width 2 and with a shape corresponding to the Fourier transform of the temporal pattern imposed by the high speed modulator 5. This is true, because as previously indicated, individual frequency components arrive at the modulator at different times. The shaped pulse which may contain coded information for communication purposes may then be directed into a receiver-demodulator 13 wherein the encoded information is read out and/or converted to other useful forms such as voice or data outputs.

It should be emphasized that the stretched pulse is chirped: each frequency component corresponds uniquely to a different temporal position within the stretched pulse. The temporal modulator, therefore, affects different frequency components differently; the temporal pattern imposed on the chirped pulse, therefore, is also imposed on the frequency spectrum of the pulse. After recompression, the frequency components are all coincident in time; however, the pattern imposed on the frequency spectrum remains. At this point, we have a shaped pulse with the pulse shape equal to the Fourier transform of the pattern transferred onto the spectrum by the high-speed modulator.

Figure 2:
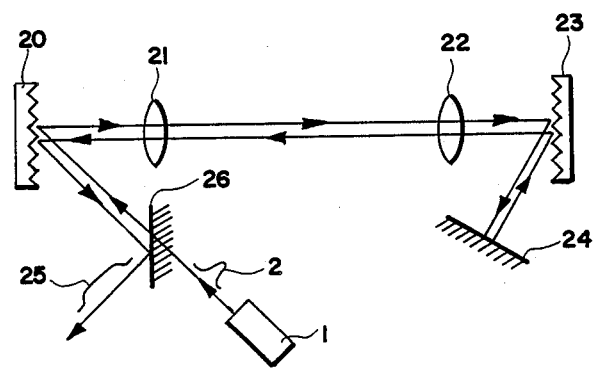
FIG. 2 is a diagrammatic representation of a temporal pulse stretcher useful in the present invention.

An example of a suitable temporal pulse stretcher 3 is presented in FIG. 2. The grating and lens arrangement shown is described by O. E. Martinez, "3000 Times Grating Compressor with Positive Group Velocity Dispersion: Application to Fiber Compression in the 1.3-1.6 $\mu$m Region", IEEE J. Quantum Electronics, QE-23, 59-64, January 1987. In accordance with this example, the input pulse 2 is directed onto a first diffraction grating 20 and then through a first lens 21 which is spaced from the first grating 20 by a distance less than the focal length, f, of the first time 21. The pulse emanating from the first lens 21 is then directed through a second lens 22 of the same focal length as the first lens 21 and spaced a distance, 2f, from the first lens 21 and then onto a second grating 23 located the same distance from the second lens 22 as the distance between the first grating 20 and the first lens 21. A return mirror 24 is positioned in the path of the output pulse from the second grating 22 so as to redirect the pulse backwards through the grating-lens pairs. The double-passed pulse is extracted at the output as a temporally stretched pulse 25 by means of a partially transparent mirror 26. The stretched pulse 25 is positively chirped (longer wavelengths precede shorter wavelengths in time). Utilizing this or similar configurations, a picosecond or femtosecond pulse may be stretched to the order of a 1 nanosecond duration using a five-inch aperture grating having a groove spacing of 1800 lines/mm. Other variations of grating/lens configurations capable of obtaining pulse stretching or compression can be found in the Martinez paper which is incorporated herein by reference.

The construction and operation of the microwave signal generator are described in the Haner and Warren paper and in references 6 and 7 referred to therein. Generally, the signal is generated by means of a field effect transistor (FET) based analog waveform generator comprising discrete FET gates which can be individually D.C. biased. A trigger delay and phase adjustment is included for each FET so that when the array of FET gates are triggered, the different output pulses are cascaded to form a single analog pulse. If switching times of the individual FET's are in the order of 8 psec., microwave pulses can be generated having very sharp features.

Suitable high-speed modulators have also been described in the literature and are also known in the art. For example, in the Haner and Warren paper referred to above, a modulator having a 20 psec rise time and 35

FWHM is mentioned. Modulators having a 20 psec rise time and 26 GHz bandwidths are discussed by S. K. Korotky et al. in an article entitled, "Optical Modulator Above 20 GHz Using Waveguide Electro-Optic Switch", paper FB-4, Picosecond Electronics and Optoelectronics Conference Digest, Jan. 14–16, Incline Village, Nevada, 1987 and incorporated herein by reference.

A suitable pulse compressor 11 can have the same configuration as the pulse stretcher 3 but should be of opposite sign, i.e., if the pulse stretcher produces a positive chirp, the pulse compressor should produce an equal negative chirp. An example of such a compressor is shown with reference to FIG. 3. In this example, the input pulse is the stretched, chirped and shaped pulse 8 which is made to pass consecutively through a first grating 30, a first lens 31, a second lens 32, a second grating 33 and a return mirror 34 which causes a double-pass of the pulse through the compressor 11. The output is the shaped ultra-short pulse 12. The difference between the compressor 11 of FIG. 3 and the pulse stretcher 3 of FIG. 2 is that the lenses 31 and 32 are spaced from the gratings 30 and 33, respectively, by a distance greater than the focal length of the lenses and the lenses are separated from each other by $2f$. It should be noted, as taught by Martinez, the lenses need not be of the same focal length. Compression giving rise to a negative chirp can also be achieved using a grating pair without lenses as described by E. B. Tracy, "Optical Pulse Compression with Diffraction Gratings", IEEE Journal Quantum Electronics, QE-5, 454-8, (1969).

In addition to the above technique, one may amplify the stretched pulse by known techniques to provide chirped pulse amplification. It should be noted that amplification can be achieved anywhere in the system between the pulse stretcher and the pulse compressor. Examples of suitable amplifiers can be found in the M. Pessot et al. reference, supra, and D. Strickland et al., Optics Communications 56, 219 (1985) which are incorporated herein by reference.

Receivers and demodulators for analyzing or decoding modulated pulse trains are known in the art and need not be amplified upon herein.

While a specific example of a temporal pulse stretcher and a temporal pulse compressor are set forth, it should be understood that any complementary pair of temporal pulse stretcher and pulse compressor is suitable in operation of the invention. For example, the stretcher may provide a negative chirp and the compressor a positive chirp of essentially equal magnitude. Also, means other than the use of gratings or grating/lens combinations can be employed. For example, one may employ a long, preferably single mode optical fiber to achieve pulse stretching or compression; dispersion-shifted fibers may be utilized to achieve either upchirp or downchirp, depending upon the pulse frequency. Also, a resonant absorber, either gaseous, liquid or solid can be employed to obtain pulse compression or stretching. An example of this can be found with reference to the article by H. Nakatsuka et al. entitled, "Nonlinear Picosecond Pulse Propagation Through Optical Fibers with Positive Group Velocity Dispersion", Physics Review Letter, 47, 910-913 (1981). Still another means of achieving temporal dispersion is by use of dispersive (planar) waveguides.

It should also be noted that various modulators can be employed. For example, one can employ bulk electro-optic modulators, waveguide type electro-optic modulators, quantum confined Stark effect electro-optic modulators and optically controlled modulators e.g., one using optical Kerr effect and second order electro-optic susceptibilities.

Figure 3:
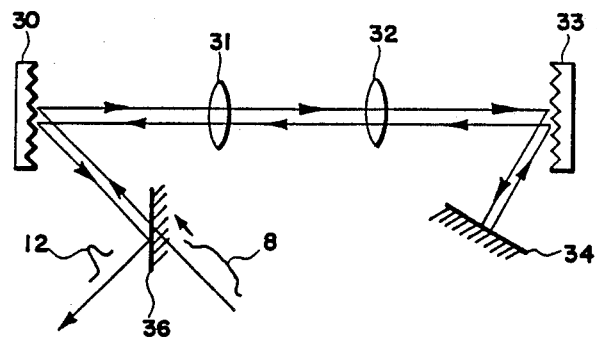
FIG. 3 is a diagrammatic representation of a temporal pulse compressor useful in the present invention.
Figure 4:
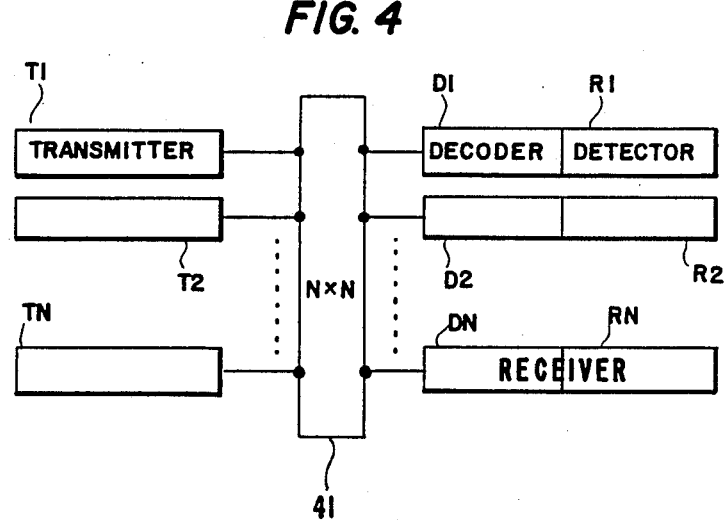
FIG. 4 is a diagrammatic representation of a novel code division multiple access communication system utilizing temporally stretched, chirped and compressed pulses.

Referring now to FIG. 4, there is shown a code division multiple access (CDMA) communication system utilizing the temporally shaped chirped pulse as described with reference to the apparatus of FIG. 1-3. Similar CDMA systems using pulses which are coded/decoded by spatial techniques are described in the previously mentioned copending application of Brackett, et al. The systems described therein which are incorporated herein by reference are equally suitable when using the pulse shaping technique of this invention.

In accordance with the configuration shown in FIG. 4, a plurality of N transmitters T1, T2 . . . TN are coupled to a plurality of receivers R1, R2 . . . RN by means of a NxN coupler 41. Each transmitter comprises a pulse shaper such as is included in the description with reference to FIG. 1. The ultra-short pulse is shaped so as to be encoded with a specific code. The front end of each receiver R1, R2 . . . RN has a decoder, D1, D2, . . . DN which recognizes a specific code allowing only those signals having a matching code to pass therethrough to a detector or data recovery section of the receiver. Consequently, the shaped encoded pulse from a transmitter will only be received by the particular receiver having a decoder for that specific code thereby allowing any transmitter to communicate with any receiver providing the transmitter can be encoded with a code which matches each receiver. This can be done by the programmable modulator in the transmitter. Where the codes do not match, a communication link is not established. Codes are chosen to be minimally interfering among themselves. This CDMA scheme provides substantially the same advantages as the CDMA system of the copending application referred to above. The stretched, chirped pulse of the transmitter may be modulated by a programmable microwave modulator as previously described or preferably by means of a high-speed phase modulator to encode the transmitted pulse by assigning it a different phase in each of a series of preassigned temporal bins, each bin being temporally separated and corresponding to a different frequency. The modulator is driven by an electricl waveform corresponding to the unique assigned code. The recompressed encoded pulse from the transmitter gives a low intensity pseudonoise burst in time which is the Fourier transform of the coding waveform.

The decoder portion of the receiver resembles the encoder of the transmitter. More particularly, the encoded compressed pulse from the transmitter upon reaching the decoder of the receiver is first temporally stretched. The stretched pulse then passes through a high-speed phase modulator driven by a phase conjugated code corresponding to the code of a particular transmitter. The phase conjugated code produces a waveform equal and opposite to the encoder at the transmitter and gives a net result of no phase change. The decoded pulse is then recompressed restoring the original short intense pulse. The compressed decoded pulse then may be made to pass through an optical threshold detector. If the receiver code does not match that of a particular transmitter, it will modify, but not eliminate, the phase changes made at the transmitter. The modified pulse results in a low intensity pseudo-noise burst which is rejected by the threshold detector.

Such a system enjoys the advantages of CDMA including multiplexing over a single communication channel (fiber or free space), the ability to reconfigure and the ability to connect any transmitter to any receiver by assigning appropriate codes to the transmitter.

This CDMA system would be synchronous, in the sense that transmitter and receiver coding sequences should be synchronized. A set of codes appropriate for this CDMA system is the well known Gold codes. This is in contrast to the CDMA system of the aforementioned copending application which employs spatially patterned masks for encoding which corresponds to an asynchronous CDMA, since no synchronism is required between transmitters and receivers.

It should be noted that one could modify the system by eliminating the temporal compression in the transmitter. If this is done, the stretcher of the receiver decoder will also be eliminated. It should also be understood that one could construct a hybrid system, wherein either the transmitter or the receiver employs spatial pulse shaping techniques, while the other of the pair employs the temporal pulse shaping techniques described herein.

What is claimed is:

1. A communication system comprising an ultra-short optical pulse source, pulse stretching means responsive to an ultra-short optical pulse from said source for producing a chirped temporally stretched pulse, modulator means for serially modulating the chirped temporally stretched optical pulse in accordance with predetermined information, and pulse compression means for temporally recompressing the modulated stretched pulse so as to result in a shaped ultra-short optical pulse containing retrievable information in accordance with said modulation.

2. The communication system recited in claim 1 including a receiver for retrieving the modulated information on the compressed pulse.

3. The system recited in claim 1 wherein said pulse stretching means and pulse compression means produce chirps which are equal in magnitude but of opposite sign.

4. The system recited in claim 3 wherein said pulse stretching means comprises a pair of spaced gratings, a pair of spaced lenses having a focal length, f, situated in the pulse path between said gratings, the distance between the grating and lens nearest said grating being less than f and the distance between lenses being $2f$, and a mirror to redirect the pulse back through the grating and lens pairs.

5. The communication system recited in claim 4 wherein said pulse compression means is similar to said pulse stretching means except that the distance between grating and nearest lens is greater than f.

6. The communication recited in claim 3 wherein said modulator means comprises an electro-optic modulator driven by a programmable signal source.

7. The communication system recited in claim 1 wherein said pulse source is a mode-locked laser producing pulses in the picosecond to femtosecond range.

8. The communication system recited in claim 1 wherein said pulse modulator comprises a programmable electro-optic modulator.

9. The communications system recited in claim 8 wherein said modulator means is driven by a programmable, shaped microwave signal source.

10. The communication system recited in claim 1 wherein said pulse compression means is selected from dispersion shifted optical fiber, a resonant absorber, single mode fiber, dispersive waveguide and grating-lens arrangement.

11. The communication system recited in claim 1 wherein said pulse stretching means is selected from the group consisting of single mode optical fiber, dispersion shifted optical fiber, dispersive waveguide and grating-lens arrangement.

12. A method for producing shaped pulses from an ultra-short optical pulse comprising the steps of:
  (1) temporally stretching said ultra-short optical pulse to produce a chirped stretched optical pulse;
  (2) temporally serially modulating said chirped stretched optical pulse in accordance with predetermined information; and
  (3) temporally recompressing said modulated optical pulse to reform said ultra-short optical pulse, said reformed optical pulse having a desired shape in accordance with the Fourier transform of the temporal modulation.

13. The pulse shaping method recited in claim 12 wherein pulse stretching produces a chirped pulse and wherein pulse compression and pulse stretching are equal in magnitude but opposite in sign.

14. The pulse shaping method recited in claim 13 wherein the temporal changes to the initial pulse are achieved by means of a dual grating/lens system.

15. The pulse shaping method recited in claim 14 wherein said modulation is electro-optic modulation driven by a programmably shaped microwave signal source.

16. A synchronous code division multiple access communication system comprising a source of ultra-short optical pulses, a plurality of transmitters, a plurality of receivers and coupling means for coupling said transmitters with said receivers, CHARACTERIZED IN THAT (a) said transmitters comprise temporal pulse stretching means which stretches said ultra-short optical pulses and chirps said pulses, and high-speed phase modulator means for serially encoding said chirped pulses in accordance with predetermined information; and (b) said receivers comprise decoder means including a high-speed phase modulator which is equal and opposite to a particular transmitter modulator code, temporal pulse compression means for reforming said ultra-short optical pulse, and a threshold detector for discriminating between pulses wherein the phase shift impressed upon the pulse at the transmitter is negated in the decoder of the receiver from those that are merely modified at the receiver.

17. The communicating system recited in claim 16 including temporal pulse compressor means in said transmitters for temporally compressing said chirped, encoded pulses; and temporal pulse stretching means in the front end of each receiver for temporally stretching the compressed encoded ultra-short pulses from the transmitter, prior to decoding said pulse.

18. A method for communicating information between one or more transmitters and one or more receivers comprising the steps of:
  (a) providing ultra-short optical pulses in the picosecond to femtosecond range;
  temporally stretching and chirping said pulses;
  serially encoding a modulated signal onto said chirped pulses in accordance with predetermined information; said encoded signal being the conjugate of a receiver code;

coupling said encoded signal to said receivers;

decoding said signal in said receivers; and (f) discriminating between decoded pulses which are the conjugates of the encoded signal from those which are not such that only the decoded conjugate signal is passed to a detector for further processing optical pulses from such a transmitter.

19. The method recited in claim 18 wherein encoding is accomplished by high-speed programmable phase modulation.

20. The method recited in claim 18 including the step of amplifying said stretched pulse.

21. The method recited in claim 18 wherein an optical threshold detector is employed for discriminating between pulses.

22. The method recited in claim 18 including the steps of temporally compressing the encoded pulse from said transmitters and subsequently temporally stretching said pulse before decoding in said receivers.

23. A system for communicating information between one or more transmitters and one or more receivers comprising a source of ultra-short optical pulses, pulse stretching means for stretching and chirping the ultra-short optical pulse, high-speed serial modulator means for modulating the stretched chirped pulse in accordance with predetermined information, and pulse compression means for recompressing the modulated chirped pulse, said pulse compression means creating a chirp opposite in sign and equal in magnitude to the chirp produced upon pulse stretching so as to result in a shaped ultra-short optical pulse containing information which is retrievable by said receiver.

* * * * *